United States Patent [19]

Furmaga

[11] Patent Number: 4,539,800
[45] Date of Patent: Sep. 10, 1985

[54] SHRUB RUG

[76] Inventor: Walter V. Furmaga, 35268 Bennett, Livonia, Mich. 48152

[21] Appl. No.: 444,806

[22] Filed: Nov. 26, 1982

[51] Int. Cl.³ .............................................. A01D 46/22
[52] U.S. Cl. .......................................... 56/329; 47/9; 47/25; 47/32
[58] Field of Search ................... 47/25, 32, 9; 56/329; 150/52 R; 428/64, 66

[56] References Cited

U.S. PATENT DOCUMENTS

| 872,764 | 12/1907 | Smith | 56/329 |
|---|---|---|---|
| 2,749,695 | 6/1956 | Hoppingarner | 56/1 |
| 4,058,956 | 11/1977 | Skonieczny | 56/1 |

Primary Examiner—George F. Lesmes
Assistant Examiner—P. R. Schwartz
Attorney, Agent, or Firm—Barnes, Kisselle, Raisch, Choate, Whittemore & Hulbert

[57] ABSTRACT

A part circle metal frame having a mat secured thereto which is centrally foldable about a skid bar for catching shrub trimmings in an unfolded position beneath a shrub, for removing the shrub trimmings from beneath the shrub on the skid bar and for transporting the shrub trimmings to a refuge container with the frame and mat folded to form a pouch having a rigid frame.

11 Claims, 4 Drawing Figures

SHRUB RUG

BACKGROUND OF THE INVENTION

1. Field of the Invention

The invention relates to trimming shrubs or clippings or the like and refers more specifically to a foldable shrub rug including a flexible mat on a foldable metal frame which may be positioned beneath a shrub to be trimmed to facilitate cleaning up the shrub trimmings.

2. Description of the Prior Art

In the past, shrub trimming has been an undesirable gardening job due to the necessity of an individual picking up the shrub trimmings which are often intermingled with wood chips, stones and the like and disposing of the trimmings and the necessity of cleaning up such shrub trimmings immediately upon finishing trimming of shrubs to prevent damage to underlying plants, grass, and the like and unsightleness.

Drop cloths and the like have been utilized to catch shrub trimmings, however, drop cloths are unworldly to install, are likely to displace ground coverings and damage surrounding shrubs and plants when removed and are subject to spilling of the shrub trimmings on being removed and while transporting the shrub trimmings to the refuge container.

SUMMARY OF THE INVENTION

In accordance with the present invention, a shrub rug is provided which includes a stiff part circular frame which is foldable centrally about a skid bar therefore having a mat secured thereto over the entire partial circle defined by the frame.

The shrub rug of the invention may be readily positioned beneath a shrub to be trimmed, may be removed from beneath the shrub to be trimmed on the skid bar after the trimming is finished and may be folded to retain the shrub trimmings in the mat in a pouch like configuration for transport and deposit in a refuge container.

DESCRIPTION OF THE PREFERRED EMBODIMENT

Figure 1:
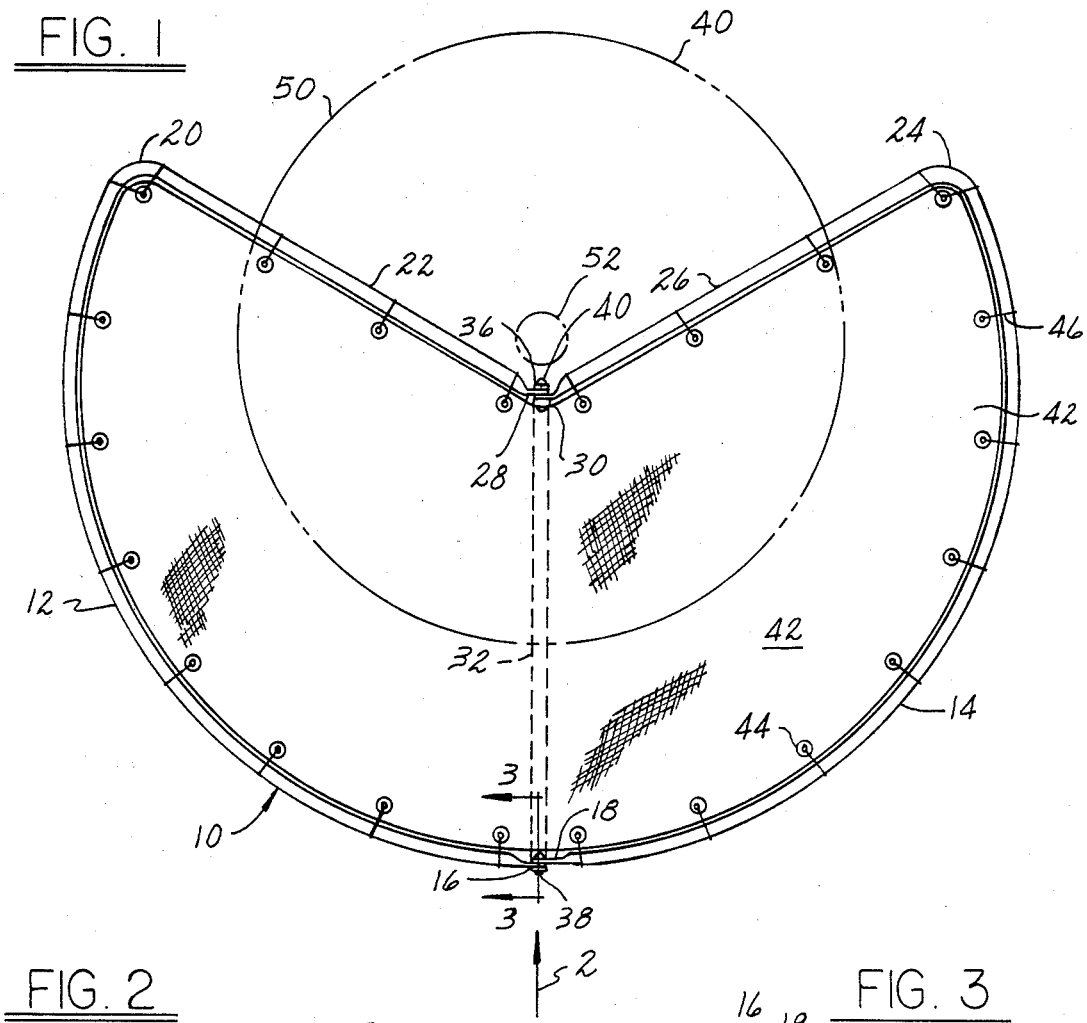
FIG. 1 is a plan view of the shrub rug of the invention in an unfolded position beneath a shrub to be trimmed.
Figure 2:
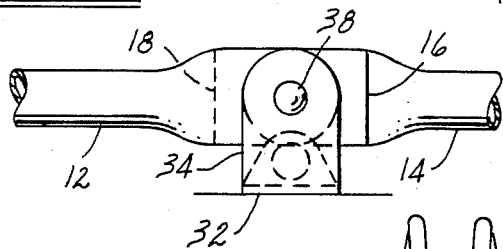
FIG. 2 is an enlarged partial elevated view of the shrub rug of the invention taken in the direction of arrow 2, in FIG. 1.
Figure 3:
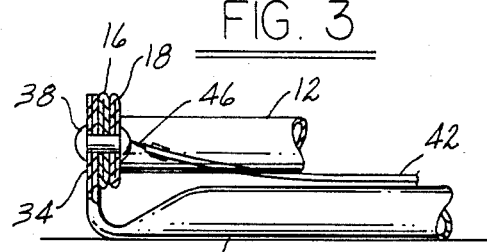
FIG. 3 is an enlarged partial section view of the shrub rug of the invention taken substantially on the line 3—3 in FIG. 1.
Figure 4:
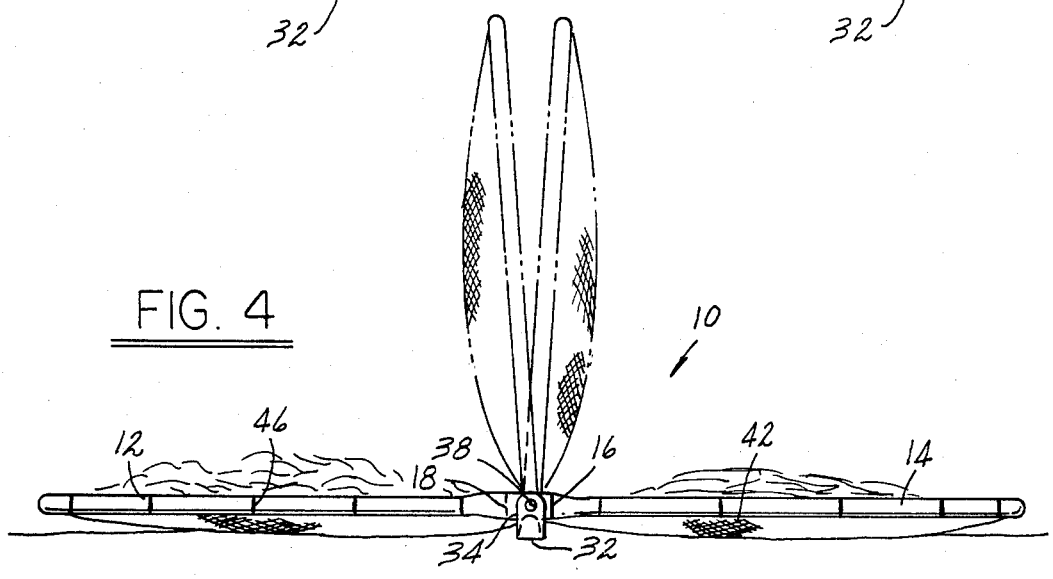
FIG. 4 is an elevation view of the shrub rug of the invention taken substantially in the direction of arrow 2 in FIG. 1, showing the shrub rug of the invention in unfolded position in solid lines and illustrating the shrub rug of the invention in a folded condition in phantom.

As shown best in FIG. 1, the shrub rug 10 of the invention includes a pair of part circular frame members 12 and 14, each of which frame members extend over an arc of approximately 120°. The end 16 of the frame member 12 and the end 18 of the frame member 14 are flattened and pierced so as to have aligned openings therethrough.

The frame member 12 is bent at 20 and returned to the center of the circle defined thereby along a radially extending portion 22. Similarly, the frame member 14 is bent at 24 andd returned along a radially extending portion 26 to the center of the circle defined by the connected frame members 12 and 14. The ends 28 and 30 of the radially extending portions 22 and 26 of the frame members 12 and 14 are again flattened, pierced and overlapped to provide aligned openings therethrough.

A U-shaped tubular skid bar 32 extends between the ends 16 and 18, 28 and 30, of the frame members 12 and 14 as shown best in FIG. 1. The upturned ends 34 and 36 of the skid bar 32 are again flattened and pierced to provide openings therethrough aligned with the openings in the ends of the frame members 12 and 14.

Rivets 38 and 40 are provided extending through the aligned openings through the frame members 12 and 14 and the skid bar 32 to secure the frame member 12 and 14 and the skid bar 32 together with the frame members 12 and 14 being foldable about the skid bar 32 which as shown again extends substantially radially of the circular section defined by the frame members 12 and 14.

Although it is not essential, the frame members 12 and 14 and the skid bar 32 may each be constructed of aluminum tubes, such as the tubes used for construction of lawn furniture and the like, bent, flattened, and pierced as described above.

The shrub rug further includes a mat 42 having substantially the same configuration as the frame members 12 and 14 in an unfolded plan position as shown in FIG. 1. The mat 42 may be constructed of canvas, plastic, reinforced fabric or other such flexible material and is provided with reinforcing grommets 44 in spaced relation around the periphery thereof. Suitable fasteners such as plastic or wire clips 46 extending over the frame members 12 and 14 and through grommets secure the mat 42 to the frame members 12 and 14 over the skid bar 32 as shown in FIG. 1.

In use, when it is desired to trim a shrub such as a shrub 48 having the foliage 50 to be trimmed and a general trunk structure 52, the shrub rug 10 is unfolded and inserted beneath the shrub with one end of the skid bar 32 against the trunk structure 52, as shown in FIG. 1. The portion of the shrub above the shrub rug is then trimmed with the trimmings falling onto the shrub rug. The shrub rug may be moved around the shrub so that the entire shrub may be trimmed.

With the trimmings of the shrub being trimmed laying on the shrub rug, the rigid frame members 12 and 14 are folded upwardly slightly and the shrub rug is removed from beneath the shrub 48 on the skid bar 32.

After the shrub rug 10 with the trimmings thereon has been removed from under the shrub 48 of the frame members 12 and 14 may be pivoted about the skid bar 32 to cause the mat 12 to fold centrally and form a pouch in which the shrub trimmings may be carried to a refuge container.

Thus, in use the shrub rug of the invention which is particularly simple and economic device, permits rapid efficient cleaning up of shrub trimmings without displacement of or damage to underlying earth and plants. Further, when not in use the shrub rug 10 in its folded condition may be hung on a nail in a garage wall or the like.

While one embodiment of the invention has been considered in detail, together with modifications thereof, it will be understood that other embodiments and modifications of the invention are contemplated.

For example, the mat 42 could be secured to the frame members 12 and 14 in a number of ways, thus the mat may be folded over the frame members 12 and 14 and stitched in place on the frame members or threaded on the frame members after stitching. Alternatively, snaps could be used to secure the mat to the frame members, likewise the frame members may be plastic and may be solid rather than tubular.

It is the intention to include all such modifications of the invention as are defined by the appended claims within the scope of the invention.

I claim:

1. A shrub rug for catching shrub trimmings and removing them from beneath a shrub comprising a substantially completely rigid frame defining only the entire outer periphery thereof all portions of which rigid frame are connected together and which frame is adapted to be inserted beneath a shrub and positioned on the ground, a complete mat having no openings therein which would allow trimmings to fall therethrough provided within the frame secured to the frame around the entire periphery of the mat, said frame being foldable substantially centrally of the frame and mat to provide a substantially shorter maximum shrub rug dimension for storage when not in use and whereby on withdrawal of the unfolded frame and mat secured thereto from beneath a shrub with the shrub rug in use with shrub trimmings thereon the frame and mat may be folded with the mat forming a pouch with the said trimmings therein which pouch is within a rigid frame and within which pouch the trimmings may be transported to a refuge container, wherein the frame and mat extend over substantially 240° of a circle with the fold dividing the frame and mat into approximately 120° circular sections.

2. Structure as set forth in claim 1, and further including a skid bar secured to the frame centrally thereof about which the frame and mat are foldable.

3. Structure as set forth in claim 2, wherein the skid bar extends downwardly with respect to the plane of the frame and mat in position to collect shrub trimmings to provide a skid on which the frame and mat may be positioned under and removed from under a shrub.

4. Structure as set forth in claim 2, wherein the mat is positioned on top of the skid bar.

5. A shrub rug comprising a pair of frame members extending approximately 120° about a circle one end of which are flattened, overlapped and pierced and the other end of each of which are turned into a radially extending portion which radially extending portions terminate in flattened ends which are also overlapped and pierced, a U-shaped tubular skid bar having relatively short leg portions which are pierced extending between the overlapping portions of the ends of the frame members, rivet means extending through the pierced frame member ends and skid bar leg portions to permit folding of the frame members into a circular section of approximately 120°, a mat having an outline defined by the connected and unfolded frame members and means securing the mat around the periphery thereof to the frame members on top of the skid bar whereby on positioning the shrub mat in an unfolded position beneath a shrub with one end of the skid bar against the trunk of the shrub a portion of the shrub may be trimmed with the trimmings falling on the mat, the shrub rug may be rotated about the trunk to facilitate trimming the entire shrub and after the shrub has been completely trimmed, the shrub rug may be removed from beneath the shrub guided on the skid bar and subsequently folded whereby the shrub rug may be used to carry the clippings to a refuge container in the mat folded into a pouch configuration.

6. A shrub rug comprising a pair of frame members extending approximately 120° about a circle one end of each of which is flattened, overlapped and pierced and the other end of each of which is turned into a radially extending portion, the radially extending portions terminating in flattened ends which are overlapped and pierced, rivet means extending through the pierced frame member ends to permit folding of the frame members into a circular section of approximately 120°, a mat having an outline defined by the connected and unfolded frame members and means securing the mat around the periphery thereof to the frame members whereby on positioning the shrub mat in an unfolded position, beneath a shrub a portion of the shrub may be trimmed with the trimmings falling on the mat, the shrub rug may be roated about the trunk to facilitate trimming the entire shrub and after the shrub has been completely trimmed, the shrub rug may be removed from beneath the shrub and subsequently folded whereby the shrub rug may be used to carry the clippings to a refuge container in the mat folded into a pouch configuration.

7. A shrub rug comprising a pair of frame members extending approximately 120° about a frame center point one end of which are flattened, overlapped, and pierced and the other end of each of which are turned into a portion extending toward the frame center point which other end portions terminate in flattened ends which are overlapped and pierced, a U-shaped tubular skid bar having relatively short leg portions which are pierced extending between the overlapping portions of the ends of the frame members, rivet means extending through the pierced frame member ends and skid bar leg portions to permit folding of the frame members into a section extending approximately 120° about the frame center point, a mat having an outline defined by the connected and unfolded frame members and means securing the mat around the periphery thereof to the frame members on top of the skid bar whereby on positioning of the shrub mat in an unfolded position beneath a shrub with one end of the skid bar against the trunk of the shrub a portion of the shrub may be trimmed with the trimmings falling on the mat, the shrub rug may be rotated about the trunk to facilitate trimming the entire shrub and after the shrub has been completely trimmed, the shrub rug may be removed from beneath the shrub guided on the skid bar and subsequently folded whereby the shrub rug may be used to carry the clippings to a refuge container in the mat folded into a pouch configuration.

8. A shrub rug comprising a pair of frame members extending approximately 120° about a frame center point one end of each of which is flattened, overlapped and pierced and the other end of each of which is turned into a portion extending toward the frame center point which other end portions terminate in flattened ends which are also overlapped and pierced, rivet means extending through the pierced frame member ends to permit folding of the frame members into a section extending approximately 120° about the frame center point, a mat having an outline defined by the connected and unfolded frame members and means securing the mat around the periphery thereof to the frame members whereby on positioning the shrub mat in an unfolded position beneath a shrub a portion of the shrub may be trimmed with the trimmings falling on the mat, the shrub rug may be rotated about the trunk to facilitate trimming the entire shrub and after the shrub has been completely trimmed, the shrub rug may be removed from beneath the shrub and subsequently folded whereby the shrub rug may be used to carry the clippings to a refuge container in the mat folded into a pouch configuration.

9. Structure as set forth in claim 8, and further including a skid bar secured to the frame centrally thereof about which the frame and mat are foldable.

10. Structure as set forth in claim 9, wherein the skid bar extends downwardly with respect to the plane of the frame and mat in position to collect shrub trimmings to provide a skid on which the frame and mat may be positioned under and removed from under a shrub.

11. Structure as set forth in claim 9, wherein the mat is positioned on top of the skid bar.

* * * * *